Sept. 10, 1963    M. WIDMER ETAL    3,103,135
DRILLING MACHINE, ESPECIALLY FOR DRILLING TURBINE HOUSINGS
Filed Aug. 10, 1959    4 Sheets-Sheet 1

INVENTORS:
Manfred Widmer
Helmut Hucks
BY
Patent Agent.

Sept. 10, 1963    M. WIDMER ETAL    3,103,135
DRILLING MACHINE, ESPECIALLY FOR DRILLING TURBINE HOUSINGS
Filed Aug. 10, 1959    4 Sheets-Sheet 2

INVENTORS.
Manfred Widmer
Helmut Hocks
BY
Patent Agent

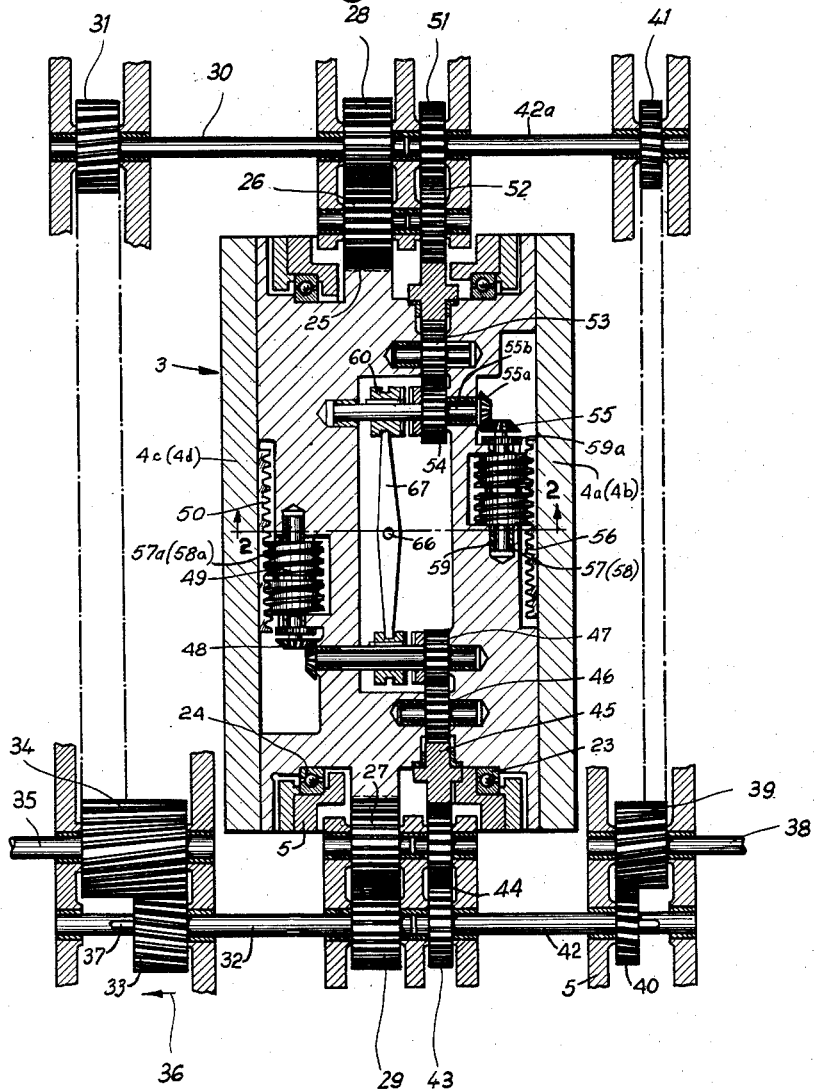

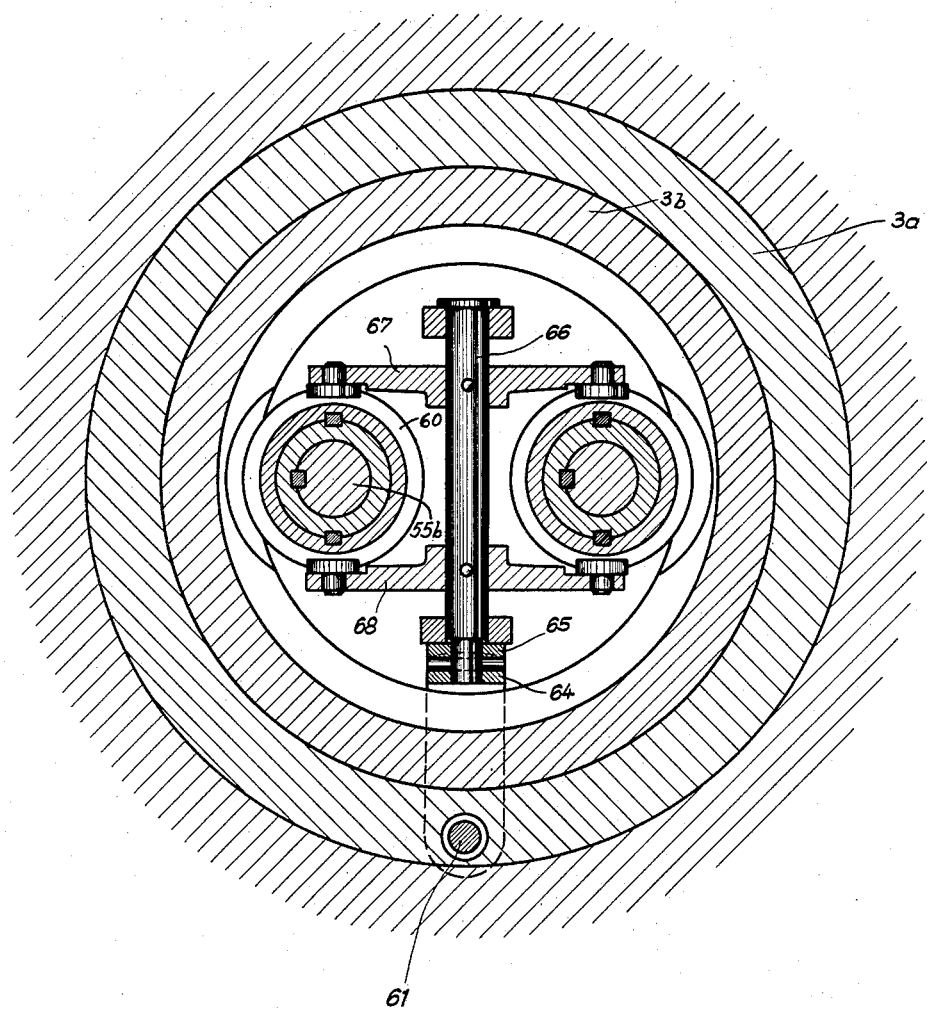

United States Patent Office 3,103,135
Patented Sept. 10, 1963

3,103,135
DRILLING MACHINE, ESPECIALLY FOR
DRILLING TURBINE HOUSINGS
Manfred Widmer, Zurich, Switzerland, and Helmut Hucks, Monchen-Gladbach, Germany, assignors to Maschinenfabrik Froriep G.m.b.H., Rheydt, Rhineland, Germany
Filed Aug. 10, 1959, Ser. No. 832,746
Claims priority, application Germany Aug. 12, 1958
6 Claims. (Cl. 77—3)

The present invention relates to a drilling machine for drilling turbine housings and the like. The machining of the inner contour of turbine housings, compressor housings and similar structural elements is as a rule effected by means of special machinery equipped with a boring bar carrying corresponding tools. With these known machines the work piece is arranged next to the transmission box of the machine. The face plate mounted on the main spindle of the transmission conveys the required torque to the boring bar flanged to the face plate. The boring bar extends through bores of bearings into the interior of the housing to be machined, while in addition to auxiliary bearings for the boring bar there are arranged on the boring bar so-called boring heads, wing supports or similar tool carriers. The feeding movement in the direction of the drilling axis in most instances is accomplished by displacement of the transmission box on a supporting bed, together with the boring bar flanged to the transmission box, whereas the work piece is stationary and fixedly connected to a clamping plate.

There are also known arrangements in which the operation is effected in an inverse order, i.e. the work piece is clamped to a table moving in the boring direction, whereas the transmission box is stationary and the boring bar carries out rotative movement only.

Additionally also heretofore known arrangements may be mentioned according to which boring bars with axially movable boring heads are employed. With these known devices, neither the transmission box with boring bar nor the work piece carries out an axial movement in boring direction, instead the boring head only moves on the rotating boring bar.

All of the heretofore known arrangements of the type involved are characterized in that they require a boring bar. Such a boring bar, however, represents a relatively long and thin machine element and therefore is subject to considerable deflection and vibration. The diameter of the boring bar is determined by the bearing bore of the work piece to be machined. Inasmuch as the diameters to be machined are a multiple of the diameter of the boring bar, the cutting rate which can be obtained is rather small, particularly if due to the bending of the boring bar in view of the boring head, the boring bar can be dimensioned only rather thin. The employment of hard metal tools is, according to experience, hardly possible. The heat resistant materials employed as is presently often the case, especially for turbine housings, have a relatively high percentage of nickel, chromium and other alloy ingredients and thus require the employment of hard metal cutting tools if a satisfactory economic machining is to be obtained. This, however, requires that the boring bar should be eliminated as a tool carrying element which conveys the rotative force.

Attempts have been made to obtain better results by employing an ordinary column type drilling machine. To this end, the face side of the head stock has been equipped with an angle support carrying a facing head arranged perpendicular to the drilling spindle and adapted to rotate. This facing head is driven by the drilling spindle or milling spindle. The feeding movement of the facing slide is derived through an angular drive from a tap shaft located at the end face of the head stock. Such an arrangement, however, has the drawback that in view of the considerable length which the angular support has to have, jamming at the head stock will occur which naturally will affect the working precision and the surface quality of the work piece. Furthermore, if the operation has to be effected in the opposite direction— which is always the case for the working range of the width of the angular support—the angular support or the work piece has to be taken out, turned by 180° and clamped in again. This is not only time-consuming but results in further inaccuracies.

It is, therefore, an object of the present invention to provide a drilling machine for turbine housings and the like, which will overcome the above mentioned drawbacks.

It is a further object of this invention to provide a drilling machine of the above mentioned type which will have an increased working range and will also be able to machine relatively short work pieces.

It is still another object of this invention to provide a drilling machine of the type set forth in the preceding paragraphs which will have an increased feeding range for the facing head.

These and other objects and advantages of the invention will appear more clearly from the following specification in connection with the accompanying drawings, in which:

FIG. 3 shows the drive for the face slides with the clutches for the face slides and is a section on line 3—3 of FIG. 2.

FIG. 4 is a sectional view taken on line 4—4 of FIG. 2.

Figure 1:
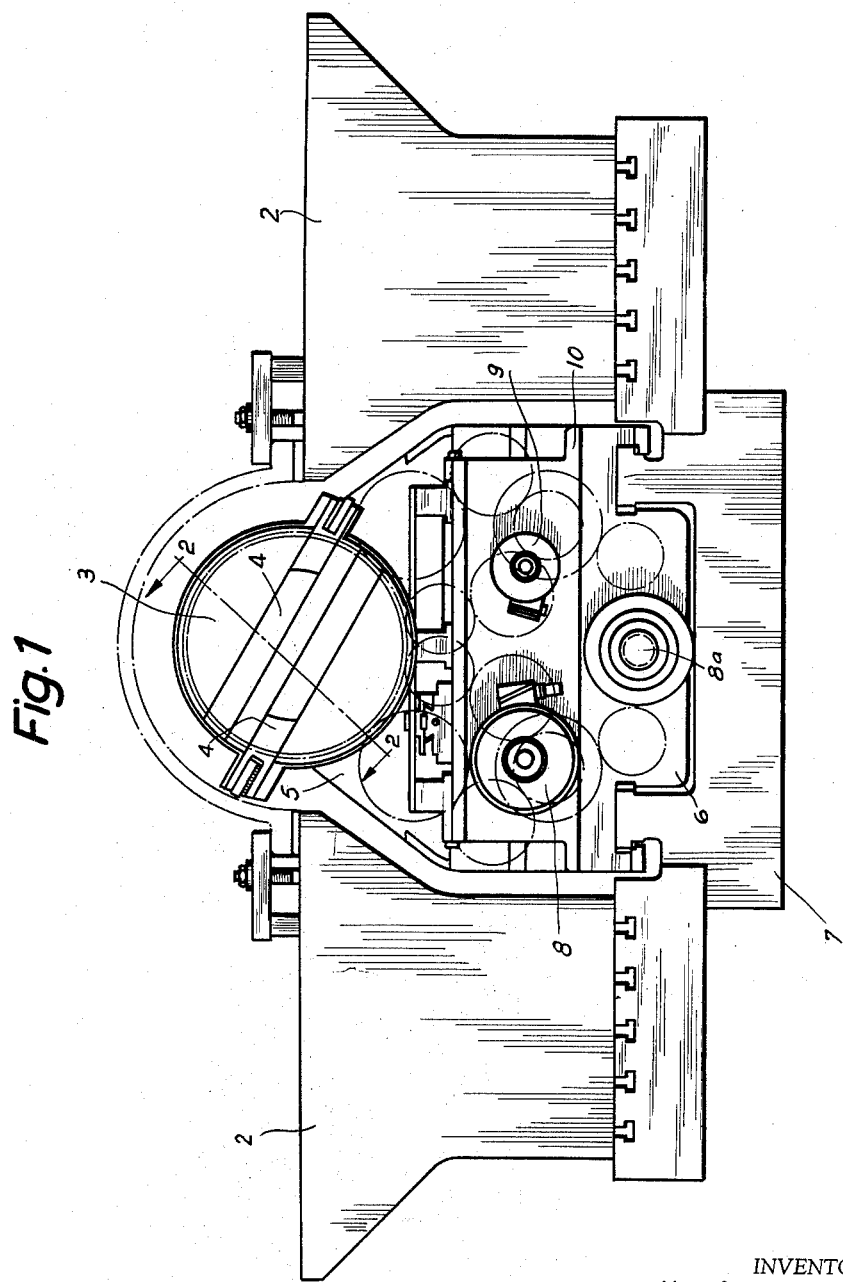
FIG. 1 is a front view of a drilling machine according to the present invention.

In the arrangement shown in FIGURE 1, the work piece which is shown in dot dash outline, and which may be a turbine housing, is clamped to clamping blocks 2 and is positioned above a rotating tool support 3 which has slideably mounted thereon the face slides 4. There are two of the face slides 4 on each side of the tool support 3 which are movable in the direction of their lengths and in respectively opposite directions. The rotatable support 3 (as may be seen in FIGURE 2), is rotatably journalled in a frame 5, as by the anti-friction bearings 23 and 24. Frame 5 is detachably mounted on a bed slide 6 reciprocably supported on stationary bed 7. Slide 6 supports drive motors 8 and 9, of which the latter is the fast traverse motor. These motors, by means of a driving mechanism in a gear box 10 effect the movement of the face slides 4 on tool holder 3 as well as bringing about reciprocation of the bed slide 6 and rotation of the tool holder 3.

Figure 2:
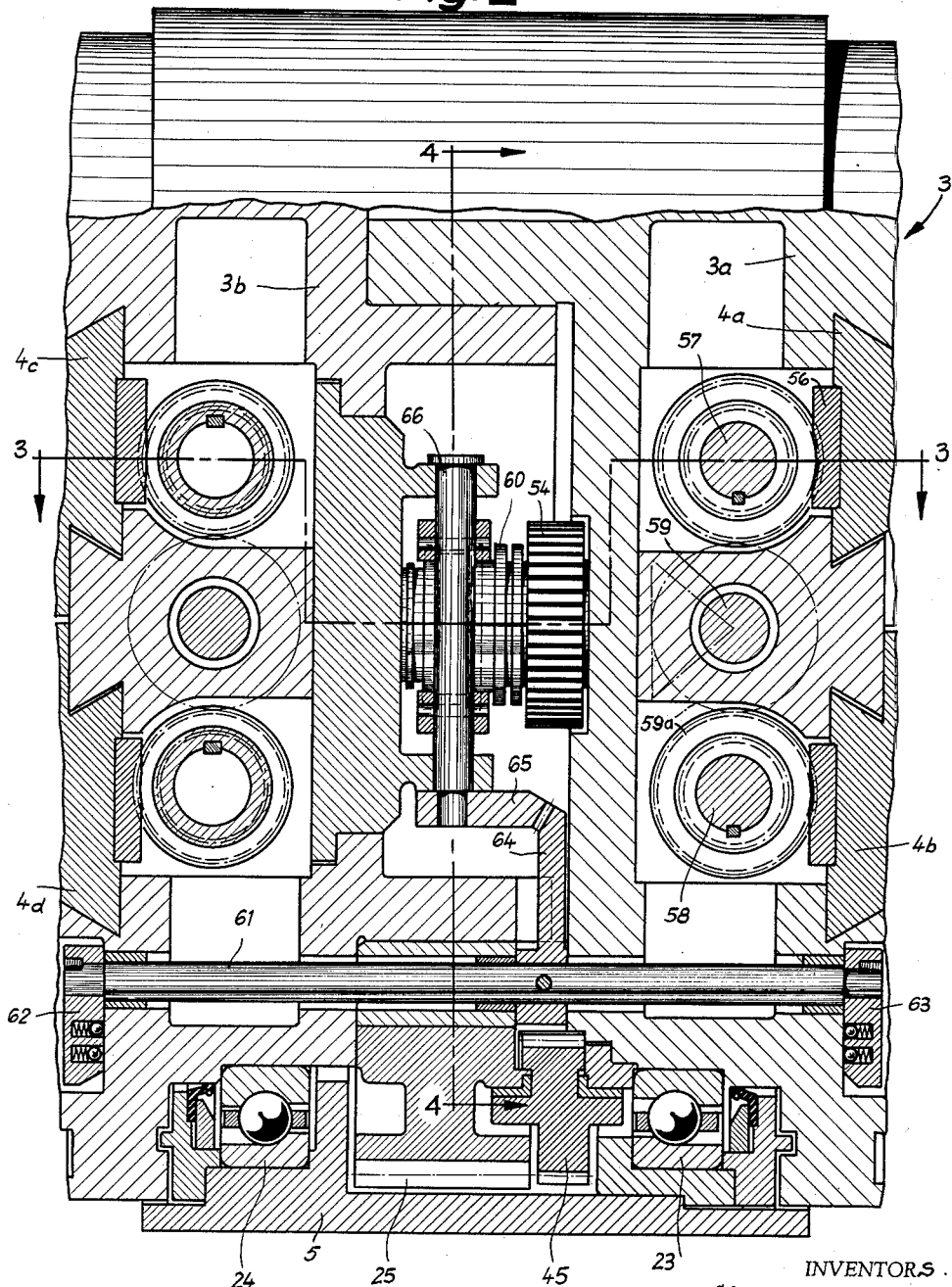
FIG. 2 is a cross section through the facing head, taken along line 2—2 of FIG. 1, and is also indicated by line 2—2 on FIG. 3.

The construction of the rotatable support 3 will best be evident from FIGS. 2 to 4. According to FIG. 2, the support body 3 is equipped on each side with a pair of face slides 4. In FIG. 2, slides 4a and 4b are on one side while slides 4c and 4d are on the other side. In FIG. 3, one slide 4a and 4c is respectively illustrated on each side. Support body 3 is equipped with an outer gear ring portion 25 meshing with two gears 26 and 27 which are rotatable in frame 5. These gears, 26 and 27, are, in turn, operatively connected with gears 28 and 29 also rotatable in frame 5. Gear 28 is, by means of shaft 30, connected to a pinion 31, while gear 27 is connected to a pinion 33 through a shaft 32.

The two pinions 31 and 33 mesh with a gear 34 which is connected with the input shaft 35. The two pinions 31 and 33 are interconnected in a back-lash free manner so as to eliminate any play in the drive. This play will be avoided by the fact that gear 33 is displaced in the direction of arrow 36 until a resistance is encountered. The pinion will then be fastened. Due to the provided inclined teeth and keys 37, any play or back-lash will be avoided. Driving of shaft 35 will thus drive rotatable support 3 in rotation. Motors 8 and 9 are arranged to drive shaft 35 by any suitable drive means. The drive of face slides 4a to 4d is effected by a shaft 38 rotatable in frame 5 and having a gear 39 keyed thereto. This gear 39 meshes with pinions 40 and 41 rotatable in frame 5 and which are adjusted relative to each other so as to be back-lash free in the same manner as pinions 31 and 32. Pinion 40 through the intervention of shaft 42 and gears 43 and 44 drives a gear 45 which is freely rotatably mounted on the support body 3. Similarly, pinion 41 drives gear 45 through the intervention of gears 51 and 52. Gear 45 is provided with inner teeth and through the intervention of gears 46 and 47 in the support member 3 drives a bevel gear transmission 48. This bevel gear transmission is connected with worm means 49 meshing with racks 50 which are arranged on the face slides 4c and 4d, respectively. Gear 45 through gears 53 and 54 in support member 3 drives the bevel gear transmission 55 and thus brings about the drive for racks 56 for face slides 4a and 4b.

The device is so arranged that only the face slides on one side of the support are adapted to operate at a time. To this end, clutches are provided in the drive which will be seen in FIGS. 3 and 4.

One of the clutches is clearly shown in FIG. 2 which figure shows the coupling for the right-hand face slides 4a and 4b. The support body will be seen to be composed of two interfitting parts 3a and 3b, each part carrying two shafts for the face slides pertaining thereto. The face slides 4a and 4b on the right-hand side are driven by the shafts 57 and 58, respectively. Shafts 57 and 58 are connected with shaft 59 through spur gears 59a. Shaft 59 is driven by bevel gear 55 which, in its turn, is driven by bevel gear 55a that is fixed to shaft 55b on which is rotatably mounted spur gear 54. Spur gear 54 is adapted by means of clutch 60 to be connected to or disconnected from shaft 55b on which it is mounted.

The said clutch is actuated by a rod or bar 61 protruding from both ends of the support body and provided at each side with an operating lever 62 and 63, respectively (FIGS. 2 and 4). Bar 61 is provided with a gear segment 64 pinned thereto which meshes with a further gear segment 65 fixed to a bolt 66 (FIGS. 2 and 4). Bolt 66 has fixed thereto two tilting arms 67 and 68, one for each of the clutches. By actuating bar 61, the clutch for the face slides on one or the other side of the support will be selectively actuated, or both clutches can be disengaged.

In operation, shaft 38 is driven and this drives through gears 39, 40, 43, and 44; and gears 41, 51 and 52 to ring gear 45 which, in turn, drives gears 46, 47 and gears 53, 54. Actuation of the clutches will then selectively cause the face slides on either side of support 3 to be adjusted in respectively opposite directions.

It will be understood that this invention is susceptible to modification in order to adapt it to different usages and conditions; and, accordingly, it is desired to comprehend such modifications within this invention as may fall within the scope of the appended claims.

What we claim is:

1. In a drilling machine for turbine housings and similar structures: a rotatable support, two pairs of face slides respectively mounted on opposite sides of said support, the face slides of each of said pairs being displaceable in opposite direction with regard to each other, and adjusting means operatively connected to said pairs of face slides for displacing the slides and including clutch means operable to clutch said adjusting means to one of said pairs only at a time, said support being journalled and driven at its periphery.

2. In a drilling machine for turbine housings and similar structures: a rotatable support, bearing means engaging the periphery of the support for rotatably supporting said support, two pairs of face slides respectively mounted on opposite sides of said support, the face slides of each of said pairs being displaceable in opposite direction with regard to each other, adjusting means operatively connected to said pairs of face slides for displacing the slides and including clutch means operable to clutch said adjusting means to one of said pairs only at a time, two gear rings coaxial with said support arranged intermediate said bearing means, one of said gear rings being firmly connected to said support whereas said other gear ring is freely rotatably journalled on the support and provided with outer teeth and inner teeth, and gear means respectively meshing with said inner teeth and said outer teeth for respectively conveying input power and output power, the gear means meshing with said inner teeth being connected to said adjusting means for driving the adjusting means.

3. A drilling machine according to claim 2, which includes a first train of gears operatively connected with each other and with said inner teeth, and a second train of gears operatively connected in a substantially backlash-free manner with each other and with said outer teeth.

4. In a drilling machine for turbine housings and similar structures: a rotatable support, bearing means engaging the periphery of the support for rotatably supporting said support, two pairs of face slides respectively mounted on opposite sides of said support, the face slides of each of said pairs being displaceable in opposite direction with regard to each other, adjustment means operatively connected to said pairs and including clutch means operable to clutch said adjusting means to one of said pairs only at a time, two gear rings coaxial with said support arranged intermediate said bearing means, one of said gear rings being firmly connected to said support whereas said other gear ring is freely rotatably journalled on the support and provided with outer teeth and inner teeth, said adjusting means comprising gear means in the support drivingly interconnecting said face slides with said freely rotatable gear ring, said support being provided with recesses housing said gear means.

5. In a drilling machine for turbine housings and similar structures: a rotatable support, two pairs of face slides respectively mounted on opposite sides of said support, the face slides of each of said pairs being displaceable in opposite direction with regard to each other, adjusting means carried by said support connected to said face slides and operable for selectively adjusting either of said pairs only at any one time, supporting means supporting said rotatable support, a gear box carrying said supporting means, a movable slide supporting said gear box, and motor means drivingly connected to said rotatable support through said gear box, said rotatable support being supported on said support means at the periphery of said rotatable support, and gear means mounted on the rotatable support coaxial with the axis of rotation thereof and drivingly connected with said motor means for driving said rotatable support in rotation and for selectively actuating said adjusting means.

6. A drilling machine according to claim 5, which includes a bed slidably supporting said movable slide, base plate means arranged adjacent said bed, and supporting members supported by said base plate means and extending upwardly therefrom on opposite sides of said rotatable support for receiving portions of a work piece extending above said rotatable support for connecting said work piece to said supporting members.

References Cited in the file of this patent

UNITED STATES PATENTS

| | | |
|---|---|---|
| 1,953,402 | Graham | Apr. 3, 1934 |
| 2,345,060 | Morton | Mar. 28, 1944 |
| 2,739,495 | Johnson | Mar. 27, 1956 |

FOREIGN PATENTS

| | | |
|---|---|---|
| 7,698 | Great Britain | 1910 |
| 531,759 | Great Britain | Jan. 10, 1941 |